US007002451B2

(12) United States Patent
Freeman (10) Patent No.: US 7,002,451 B2
(45) Date of Patent: Feb. 21, 2006

(54) PACKAGE LOCATION SYSTEM

(76) Inventor: Jeffrey R. Freeman, 639 Pine Ave., Attleboro, MA (US) 02703

( * ) Notice: Subject to any disclaimer, the term of this patent is extended or adjusted under 35 U.S.C. 154(b) by 0 days.

(21) Appl. No.: 10/770,308

(22) Filed: Feb. 2, 2004

(65) Prior Publication Data

US 2004/0233065 A1  Nov. 25, 2004

Related U.S. Application Data

(63) Continuation-in-part of application No. 09/757,825, filed on Jan. 10, 2001, now abandoned.

(60) Provisional application No. 60/175,535, filed on Jan. 11, 2000.

(51) Int. Cl.
*G08B 5/22* (2006.01)
(52) U.S. Cl. .............................. 340/10.51; 340/824.49; 340/539.1; 340/571
(58) Field of Classification Search ............ 340/10.51, 340/825.49, 571, 572.1, 539.1, 539.19, 539.13
See application file for complete search history.

(56) References Cited

U.S. PATENT DOCUMENTS

| 3,618,059 A | | 11/1971 | Allen ......................... 340/224 |
| 3,766,560 A | | 10/1973 | Bornhorst et al. .......... 343/118 |
| 4,476,469 A | * | 10/1984 | Lander ................... 340/825.49 |
| 4,636,950 A | * | 1/1987 | Caswell et al. ............... 705/28 |
| 4,814,742 A | * | 3/1989 | Morita et al. ............. 340/10.31 |
| 4,990,888 A | | 2/1991 | Vogt et al. .................... 340/506 |
| 5,008,661 A | * | 4/1991 | Raj ........................... 340/10.51 |
| 5,063,380 A | * | 11/1991 | Wakura .................. 340/825.49 |
| 5,151,684 A | * | 9/1992 | Johnsen ................... 340/568.1 |
| 5,438,319 A | | 8/1995 | Zeytoonjian et al. ........ 340/571 |
| 5,450,070 A | * | 9/1995 | Massar et al. .......... 340/825.49 |
| 5,528,232 A | | 6/1996 | Verma et al. ........... 340/825.54 |
| 5,610,586 A | | 3/1997 | Zeytoonjian et al. ........ 340/571 |
| 5,689,238 A | | 11/1997 | Cannon, Jr. et al. ......... 340/568 |
| 5,719,555 A | | 2/1998 | Zeytoonjian et al. ........ 340/571 |
| 5,771,455 A | | 6/1998 | Kennedy, III et al. ....... 455/456 |
| 5,786,764 A | * | 7/1998 | Engellenner .............. 340/572.4 |
| 5,939,981 A | * | 8/1999 | Renney .................. 340/539.32 |

* cited by examiner

*Primary Examiner*—Edwin C. Holloway, III
(74) *Attorney, Agent, or Firm*—Weingarten, Schurgin, Gagnebin & Lebovici LLP (57) ABSTRACT

A system is provided for locating an intended package, product, or other item that may be located in an area where a number of such packages may be located, such as a warehouse, a receiving area, or the like. The system allows personnel to quickly identify a particular package or package location from among other packages in the area. The system includes a wireless transmitter operative to transmit coded signals, each associated with a respective package to be located. A receiver device such as an RFID tag is disposed on or near each particular package being sought. The receiver device upon receipt of an interrogating signal from the transmitter and recognition of a unique identifying address code indicates its presence by an audible and/or visible signal that can be directly sensed by a human.

44 Claims, 4 Drawing Sheets

PACKAGE LOCATION SYSTEM

CROSS REFERENCE TO RELATED APPLICATIONS

This application is a continuation-in-part of U.S. patent application Ser. No. 09/757,825 filed Jan. 10, 2001 abandoned entitled PACKAGE LOCATION SYSTEM, which claims priority of U.S. Provisional Patent Application No. 60/175,535 filed Jan. 11, 2000 entitled PACKAGE DETECTION SYSTEM.

STATEMENT REGARDING FEDERALLY SPONSORED RESEARCH OR DEVELOPMENT

N/A

BACKGROUND OF THE INVENTION

The present application relates generally to systems and methods of locating a particular object among many other similar and/or dissimilar objects, and more specifically to a system and method of locating a particular package, carton, skid, tote, or other item among many other similar and/or dissimilar items on a loading dock, in a warehouse, or in any other storage facility.

It is often difficult and time consuming to locate an individual package or other item in a storage facility when the package may be obscured at the bottom of a stack of packages or at the back of other items. For example, in the receiving area of a retail facility, especially where the size of the receiving area is restricted, a large volume of packages, cartons, skids, totes, and/or other items is received on a daily basis and accumulated in the receiving area and often in random fashion. For efficient distribution the items must be identified, segregated, and prioritized. Systems have been proposed for locating items by means of RFID tags that can be interrogated by a wireless signal, but such systems have been complex and/or uneconomical.

As an example of location problems, in a typical large discount store the receiving area may contain about 3,500 cartons in any given day. A typical chain drugstore may receive about 300 totes per day. Locating particular cartons or totes in such receiving areas is difficult and time consuming, especially in receiving areas that are of limited size.

As another example, shipping companies often arrange shipments on skids, which are located at a distribution center for loading onto trucks, other vehicles, or containers for shipment to various destinations. Finding particular skids intended for particular destinations is often difficult because of the number of skids present in a given location. This problem of finding "trapped freight" wastes a great deal of time in assembling shipments.

BRIEF SUMMARY OF THE INVENTION

In accordance with the present invention, a system and method are provided for locating a particular package, product, or other item that may be located in an area where a number of such packages are located, such as a warehouse, a receiving dock, or the like. The presently disclosed system and method allow personnel to identify a particular package or package location quickly from among other packages in the area. The system comprises a wireless transmitter that operates preferably at a Radio Frequency (RF), and that is operative to interrogate the packages by transmitting address codes associated with respective packages to be located. A receiver device such as an RFID tag is disposed in, on, or near each package being sought. The receiver device, upon receipt of an interrogating RF signal from the transmitter and recognition of a unique address code, indicates its presence by an audible and/or visible response that can be directly sensed by a human.

The system and method are particularly useful in handling an inventory of packages, cartons, skids, totes, and/or other items in the manufacturing, retail, and distribution industries. The presently disclosed system and method permit the location of individual items, and avoid the time consuming and physical tasks of handling and looking through or moving stacks of packages and other items to identify specific ones.

The receiver device is preferably in the form of an RFID tag that can be placed inside a package or that can be affixed to the package. The RFID tag can be programmed by the shipper or vendor to provide a unique address code, which is subsequently communicated to the recipient. The recipient can interrogate packages in a localized area by transmission of unique address codes to produce human sensible responses by the identified packages.

By employing multiple signal mediums and signal types such as (1) RF or any other suitable wireless signals to interrogate sought after packages, and (2) audible, visible, and/or any other suitable human sensible signals to indicate the detection of unique address codes, packages, cartons, skids, totes, and/or other items can be located quickly and easily and at reduced cost.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

U.S. patent application Ser. No. 09/757,825 filed Jan. 10, 2001 entitled PACKAGE LOCATION SYSTEM, and U.S. Provisional Patent Application No. 60/175,535 filed Jan. 11, 2000 entitled PACKAGE DETECTION SYSTEM, are incorporated herein by reference.

Figure 1:
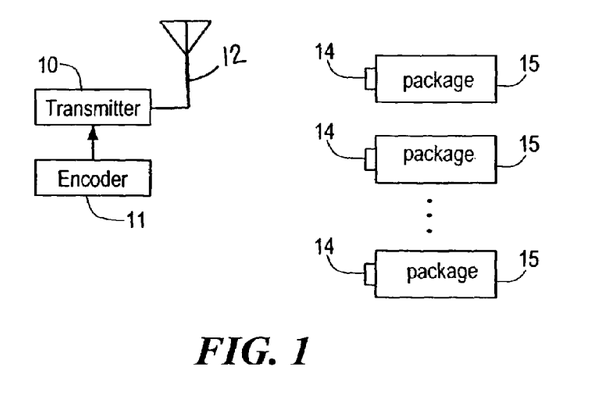
FIG. 1 is a diagrammatic representation of a system according to the present invention in which each item to be located has an associated receiver device such as an RFID tag.
Figure 2:
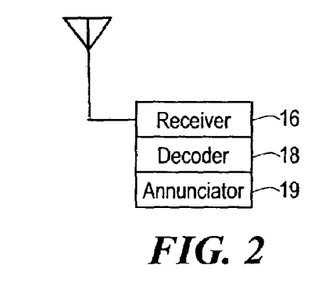
FIG. 2 is a block diagram of the receiver device of FIG. 1.

FIG. 1 depicts an illustrative embodiment of a package location system according to the present invention. In the illustrated embodiment, the package location system comprises a transmitter 10 including an encoder 11 that is programmable to provide a plurality of individual addresses each unique to a respective receiver device 14 such as an RFID tag. The transmitter 10 emits via a suitable antenna 12 a Radio Frequency (RF) signal coded with the respective address for interrogating and identifying a corresponding package or other item. The receiver device 14 is attached to respective packages 15 to be identified or is placed in the package such as a box or tote. As shown in FIG. 2, each of the receiver devices 14 includes an RF receiver section 16, a decoder section 18 that is responsive to only the particular address code intended for that device, and an annunciator section 19, which is preferably an audible and/or visual indicator activated in response to a signal from the RF receiver section 16 upon detection of the unique address code.

The encoder 11 provides respective address codes, each of which is unique to a corresponding item to be located. The coded signal can be provided by any suitable signal coding and modulation technique. The coded signal is modulated onto a carrier signal for transmission and may have any suitable signal format. Each address code may comprise an assigned code identifying a type of object, a box of objects, a skid of objects, etc. For example, a code may be assigned to identify a skid of tissue boxes, a carton of jewelry, or a tote filled with a numerous variety of different items. It should be understood, however, that the respective codes may comprise numeric codes, alphanumeric codes, or any other codes suitable for locating specific items.

Figure 3:
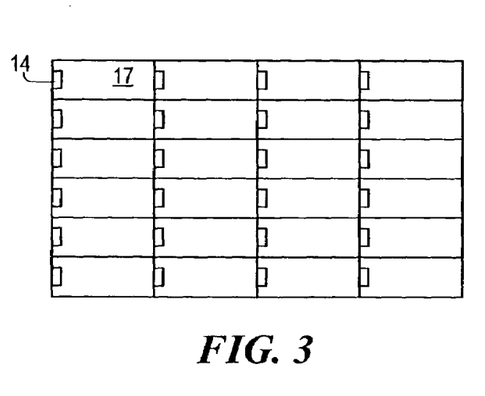
FIG. 3 is a block diagram of an illustrative embodiment of a system in accordance with the present invention in which each bin area of an inventory rack has an associated receiver device.

In the preferred embodiment, the receiver device 14 is an RFID tag that can be affixed to an item to be located. Alternatively, the RFID tag may be used with skids, totes, or other collections of items to locate the collection. The RFID tag may also be used on a bin or other definable area of items to be located. As shown in FIG. 3, the transmitter 10 communicates with a plurality of RFID tags 14, each disposed at a respective bin location 17. Upon receipt of a recognized address code of the transmitted signal, the appropriate RFID tag 14 causes an audible and/or visible output indication of the bin location.

Such RFID tags can be made relatively cheaply by techniques which themselves are known in the art of manufacturing electronic article surveillance tags or smart cards. The RFID tag circuits may be housed in a plastic or other suitable enclosure, which can be placed inside a package or other item or removably attached to packages or items such as by an adhesive.

The RFID tags can be programmed by a shipper or vendor with respective address codes for the items to be shipped to a particular recipient. The shipper communicates the tag address codes to the recipient by any convenient means such as e-mail, direct data link, or any other suitable communications technique. The recipient upon receipt of the address code list can scroll through the list and produce a series of commands to be sent by the transmitter for interrogation of the packages in a localized area. The tags responsive to their respective address codes provide a human sensible indication of package presence such as by an audible and/or visible annunciation. Because each responsive tag emits a signal that can be directly sensed by a human, the presently disclosed system allows an individual searching for a particular package to go straight to the package he or she is looking for.

In an alternative embodiment, unique address codes may be transmitted directly to the transmitter over a telephone line, a data link, or any other suitable communications link. Further, the unique address codes may be transmitted from a base station at the recipient's location to the transmitter via cable, IEEE 802.11b, IEEE 802.11g, Bluetooth, or any other suitable transmission medium. In addition, the unique address codes may be manually entered into the transmitter. Moreover, the RFID tags may be programmed by use of the transmitter or other programming apparatus.

The RFID tags are re-programmable so that they can be removed from the received packages by the recipient and sent back to the shipper for re-use. Alternatively, the RFID tags may be sent back to their original source such as a tag manufacturer or distributor for credit. The RFID tags may also be programmed with other data such as the identification of the shipper or vendor, the identification of the recipient, and/or any other data that may be useful for shipping or inventory purposes. The identification of the shipper and recipient is particularly useful as part of a recycling program in which the recipient sends used tags back to a party for credit.

Figure 4:
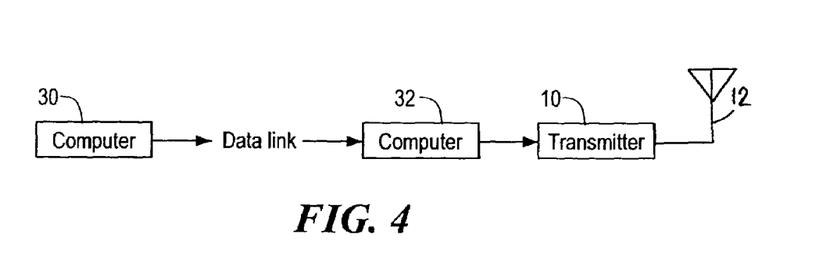
FIG. 4 is a block diagram of an illustrative embodiment in which the system is employed with computer terminals operating via a data link.

The transmitter operator may be located in the general vicinity of the RFID tags, such as in a warehouse or shipping facility. Alternatively, the transmitter operator may be located remotely from the item location. It is noted that the transmitter is located in the general vicinity of the tags. Further, a communications link may be provided between the remote transmitter operator and the transmitter. The communications link may include the Internet, wired links, wireless links, or any other suitable communications links. For use with the Internet or other computer networks, an interrogation command can be sent by the remote transmitter operator over the Internet to the transmitter, at which point an RF coded signal is transmitted in response to the received command to trigger an audible and/or visual response by the tagged item or area to be located. It is appreciated that a person would also be present in the general vicinity of the items to detect the audible and/or visual indication emitted by the tag, and to locate the tagged item or area. As shown in FIG. 4, a computer 30 is coupled via a data link to a computer 32, which provides command signals to the transmitter 10. Unique package addresses are provided by the computer 30 and conveyed over the data link to computer 32. The computer 32 provides appropriate command signals to the transmitter 10 for transmission of coded RF signals to the RFID tags. As described above, the data link may include any suitable wired or wireless link, or the Internet or any other suitable computer network.

Figure 5:
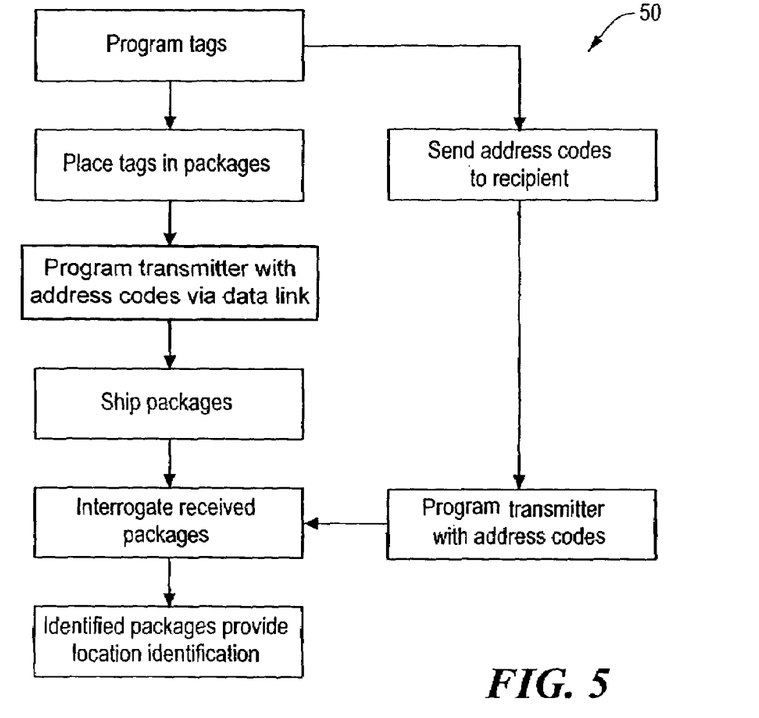
FIG. 5 is a flow diagram of system operation.
Figure 10:
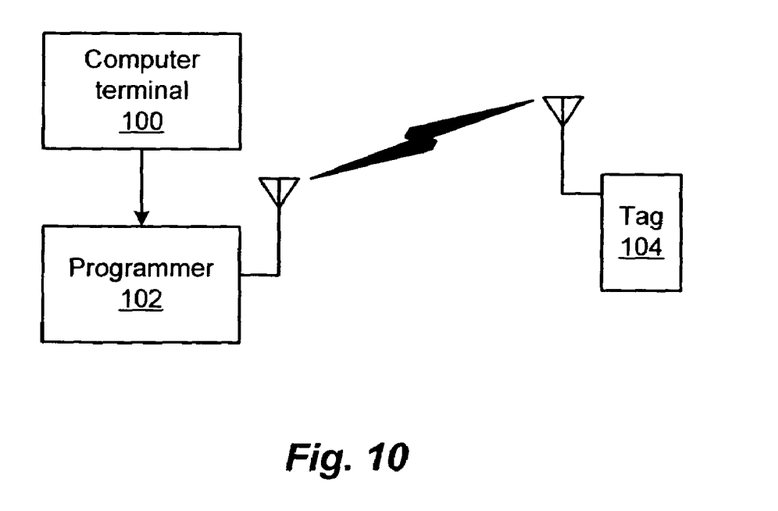
FIG. 10 is a block diagram of an alternative embodiment of the programming apparatus of FIG. 6.

The operation of the package location system is illustrated by reference to FIG. 5. A shipper or vendor programs tags associated with respective packages with address codes unique to each package. The programming is accomplished by use of computerized apparatus, which typically includes a computer terminal 60 and a programmer unit 62 providing programming signals to an RFID tag 64 (see FIG. 6). It is appreciated that the programming may alternatively be accomplished by use of the computerized apparatus of FIG. 10, in which a computer terminal 100 and a programmer unit 102 provide programming signals to an RFID tag 104 via a suitable wireless link. The RFID tag includes a memory such as EEPROM to store the unique address code. After coding the RFID tags with respective address codes, the tags are placed in respective packages or otherwise affixed or associated with those packages.

The shipper or vendor conveys the address codes to the recipient's location to program the transmitter with those address codes. This is typically accomplished as shown in FIG. 4 by transmission of address codes from the shipper's computer over a data link to the recipient's computer, which is coupled to the transmitter. In an alternative implementation, the shipper communicates the address codes to the recipient via any suitable means such as e-mail, and the recipient programs the transmitter with the address codes, as indicated by the alternative path 50 of FIG. 5.

Next, the packages with the associated coded RFID tags are shipped to an intended recipient. The recipient then sequentially interrogates the received packages with the coded signals from the transmitter, and the identified packages provide human sensible indications of their respective locations via the RFID tags.

In some instances, a user may not know the address or identification code of an item being sought. In this case, the system includes a scanning or search facility, which may be employed to find the correct address of the tag being sought. If the address is found, then an interrogating signal is sent to trigger a response by the receiving tag to denote the presence or location of the tag and the item or area to which it is associated.

Figures 6, 7:
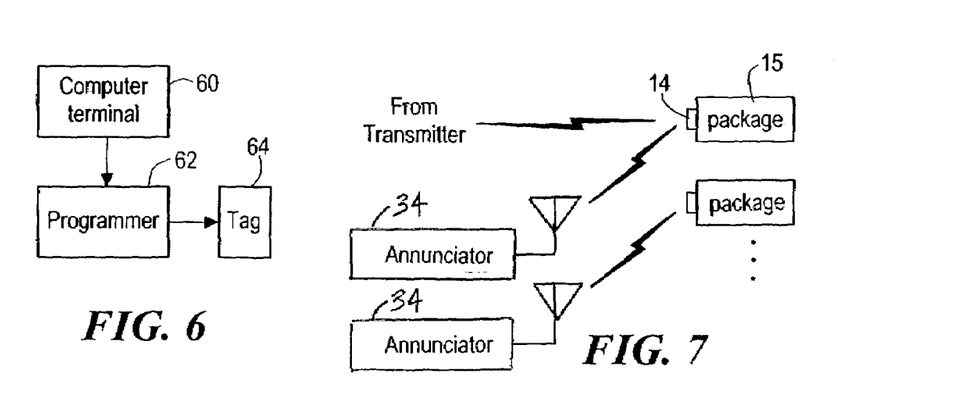
FIG. 6 is a block diagram of an apparatus for programming the RFID tag of FIG. 1.
FIG. 7 is a block diagram of an illustrative embodiment in which the system is employed with wireless annunciators.

Another embodiment is shown in FIG. 7, in which coded signals from the transmitter 10 are received by RFID tags 14 affixed to or placed in respective packages 15. The RFID tags are operative upon detection of their respective codes to radiate a signal to one or more annunciators 34. The annunciators 34 would typically be located in respective areas to locate packages associated with those areas. Upon receipt of a signal from an RFID tag, the annunciator 34 would trigger an audible and/or visual indication to denote the location.

The RFID tags employed in the presently disclosed package location system may comprise semi-passive battery-powered backscatter tags, fully active battery-powered tags, or any other suitable type of RFID tag. The preferred tag for cost reasons in the majority of system applications is the semi-passive battery-powered backscatter tag, for which the RF backscatter communications interface is being standardized. For example, see the EPCglobal Version 1 Specifications including (1) MIT Auto-ID Center, Draft protocol specification for a 900 MHz Class 0 Radio Frequency Identification Tag, Feb. 23, 2003, (2) MIT Auto-ID Center, Technical Report 13.56 MHz ISM Band Class 1 Radio Frequency Identification Tag Interface Specification, Candidate Recommendation, Version 1.0.0, Feb. 1, 2003, and (3) MIT Auto-ID Center, Technical Report 860 MHz-930 MHz Class 1 Radio Frequency Identification Tag Radio Frequency & Logical Communication Interface Specification, Candidate Recommendation, Version 1.0.1, Nov. 14, 2002, each of which is incorporated herein by reference. It is noted that fully active battery-powered tags typically provide the range needed to implement the system embodiment shown in FIG. 7.

Figure 9:
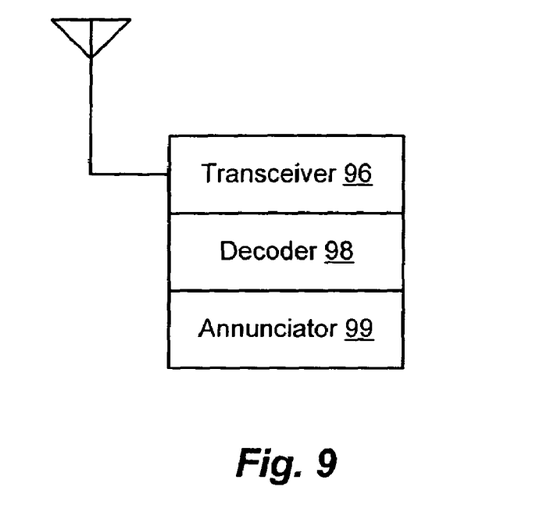
FIG. 9 is a block diagram of an alternative embodiment of the receiver device of FIG. 2.

FIG. 9 depicts an illustrative embodiment of a fully active RFID tag suitable for use in the system of FIG. 7. As shown in FIG. 9, the RFID tag includes an RF transceiver section 96, and a decoder section 98 that is responsive to only the particular address code intended for that tag. The RFID tag of FIG. 9 may also include an annunciator section 99, which is preferably an audible and/or visual indicator optionally activated instead of the annunciator 34 (see FIG. 7) in response to a signal from the transceiver section 96 upon detection of the unique address code.

Having described the above illustrative embodiments, other alternative embodiments or variations may be made. For example, the transmitter may provide wireless signals of any frequency or form such as radio, infrared, ultrasonic, etc. The RFID tags may be implemented in various circuit forms suitable for the signals and frequencies involved. The RFID tags may also be employed with packages of any form, including boxes and cartons of any type, skids, totes and other containers for items. The packages may also be employed at storage locations such as on bins, shelves, and the like.

In addition, the presently disclosed package location system and method may be used to augment existing systems that employ RFID tags for locating specific items. For example, an embodiment of the package location system described herein may be added to any suitable RFID tag configuration to facilitate the final phase of locating a specific item from among many other similar and/or dissimilar items in a localized area. When employed throughout a supply chain management operation, such augmented systems can significantly improve business performance.

In addition, it was described that the shipper or vender may place or removably attach a single programmed RFID tag in or on a package before sending the package to the intended recipient. However, it should be understood that at least one second RFID tag programmed with a unique package identification code may be associated with the item being shipped along with the tag provided by the shipper or vender. For example, the second RFID tag may be placed in an external pocket on the package or item by a driver of a common freight carrier or package delivery service. Further, the second RFID tag may be interrogated at any number of redistribution facilities for locating and identifying trapped freight, thereby optimizing labor, truck capacity, and/or delivery time. For example, this second RFID tag may be interrogated by the driver of the delivery vehicle outside the recipient's facility to assist him in locating the item within the vehicle. The driver may then remove the second RFID tag from the located item for subsequent re-use before delivering the item to the intended recipient. It is appreciated that the RFID tag initially placed in or attached to the item by the shipper or vender is not removed at this time, but remains with the item to aid the recipient in locating it within his or her facility. For example, the recipient may interrogate this first RFID tag for quickly locating the item once it is known to have arrived within his or her facility, after which the tag may be removed from the located item for subsequent re-use or for credit. Such re-use of the RFID tags permits a variety of flexible billing methods for RFID tag use with fee payment by one or more of the shipper, vender, recipient, or other user of the tag. For example, suitable fees may be established for buying, renting, or leasing reusable RFID tags, or for providing single uses of RFID tags.

In addition, it was described that the package location system and method may be used to locate specific packages sent by a shipper or vender to an intended recipient of the packages. However, it should be appreciated that reusable programmed RFID tags may also be associated with inventory or work-in-process items within a warehouse or manufacturing facility for quick retrieval of the items from among many other similar and/or dissimilar items. For example, a user may temporarily attach a programmed RFID tag to a respective item to keep track of the item's location within the facility. Similarly, a user may attach programmed RFID tags to individual kit parts for subsequent call-up in conjunction with assembly instructions. It is understood that such a user may have his or her own in-house supply of reusable programmable RFID tags.

In addition, it was described that upon detection of a unique address code, the receiver device or RFID tag emits an audible and/or visual indication that can be directly sensed by a human. It is understood, however, that the RFID tag may alternatively emit a pre-recorded message instead of a conventional audio alarm after detecting the unique address code.

In addition, it was described that each receiver device or RFID tag is battery-powered. For example, each RFID tag may be powered by an alkaline battery, a silver oxide battery, a lithium battery, or any other battery suitable for use in miniaturized devices. It is appreciated, however, that alternative power sources may be employed to power the RFID tags such as fuel cells or any other suitable power sources. Further, each RFID tag may execute a power management routine. A power management routine suitable for use by the RFID tags described herein is illustrated by reference to FIG. 8.

Figure 8:
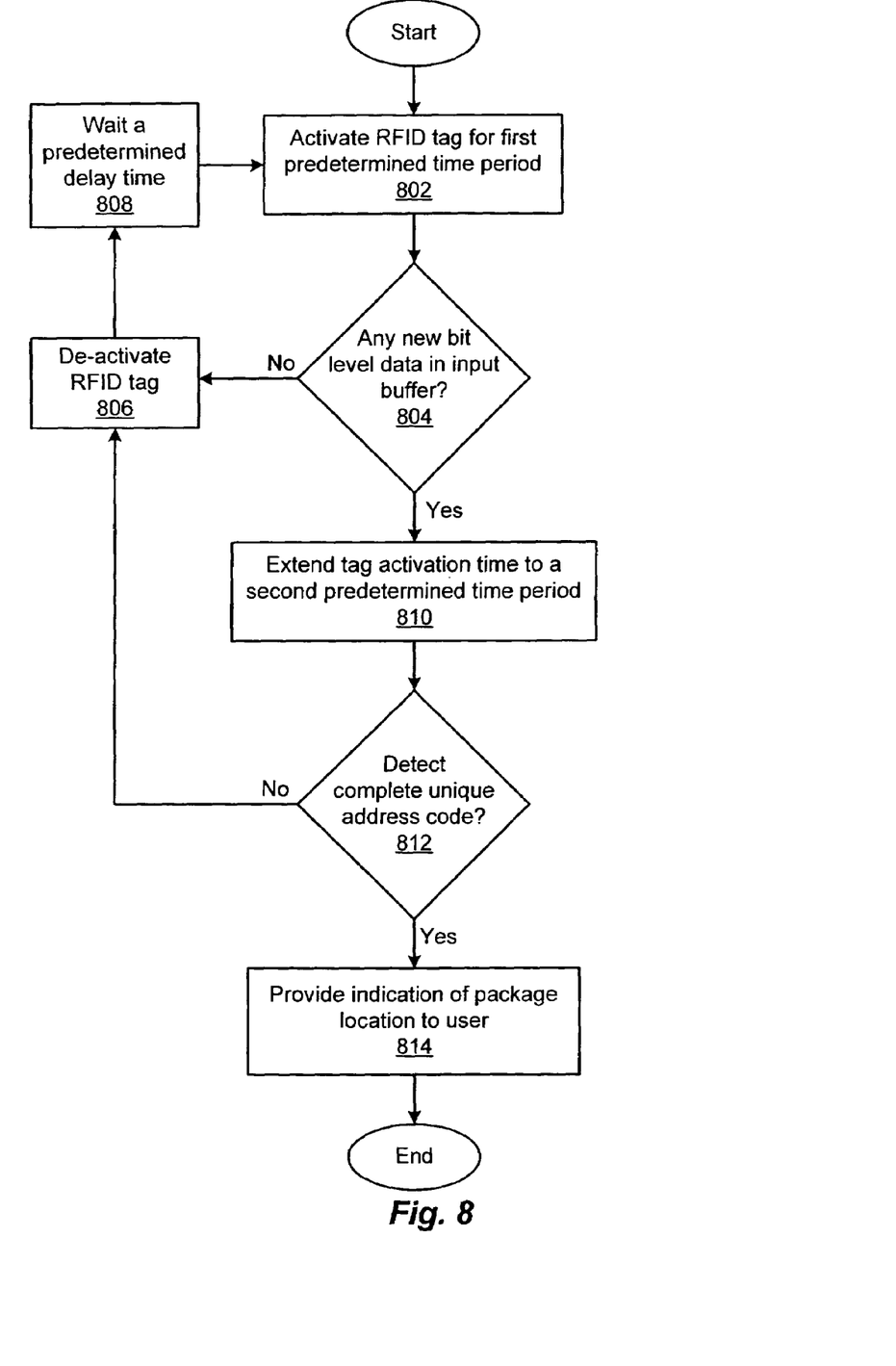
FIG. 8 is a flow diagram of a power management routine for use in the system of FIG. 1.

As depicted in step 802, a programmed RFID tag is automatically activated for a first predetermined period of time. It is understood that the RFID tag is programmed with a unique address code for locating and identifying a specific package or item associated therewith. Further, the first predetermined time period is minimal but of sufficient duration to allow the RFID tag to detect the presence of any bit level communications (e.g., bit level data from a portion of a related address code transmission or from unrelated interference) as an indication that a user is currently interrogating the package or item. Next, a determination is made, as depicted in step 804, as to whether the RFID tag detects such interrogation activity by checking for the presence of any new bit level data in its input buffer. In the event the RFID tag does not detect any such bit level data within the first predetermined time period, the tag is automatically de-activated (i.e., the RFID tag is initialized and placed in a quiescent power-down state), as depicted in step 806, thereby conserving battery power. The RFID tag remains in the power-down state for a predetermined delay time, as depicted in step 808, after which the tag is automatically re-activated to a full power state. In the event the RFID tag detects some bit level communications activity within the first predetermined time period, the tag activation time is extended, as depicted in step 810, beyond the first predetermined time period to a second predetermined period of time, which has a duration sufficient to allow the tag to detect and recognize a complete unique address code. Next, a determination is made, as depicted in step 812, as to whether the tag detects the complete unique address code. In the event the RFID tag does not detect the complete address code within the second predetermined time period, the tag is automatically de-activated (i.e., the tag is initialized and placed in the quiescent power-down state), as depicted in step 806. Again, the RFID tag remains in the power-down state for the predetermined delay time, as depicted in step 808, after which the tag is automatically re-activated. In the event the RFID tag detects the unique address code within the second predetermined time period, the tag provides an indication of the package location to the user, such as an audible and/or visible signal that can be directly sensed by the user, as depicted in step 814.

Significant advantages are derived from the presently disclosed package location system. For example, the task of locating desired items is made simpler—the user need only use his or her senses, e.g., he or she need only look and/or listen for the signal emitted by the receiving device associated with the desired item. Such a method of locating items is both fast and accurate. Further, the package location system is less prone to errors because the identifying address codes can be automatically programmed into the transmitter. In addition, because the receiving devices are reusable, the presently disclosed system and method is more economical than any other process employing tags that cannot be readily separated from the packages or products associated therewith.

It will be appreciated by those of ordinary skill in the art that modifications to and variations of the above-described package location system may be made without departing from the inventive concepts disclosed herein. Accordingly, the invention should not be viewed as limited except as by the scope and spirit of the appended claims.

What is claimed is:

1. A method of identifying a location of at least one particular item among a plurality of items disposed within a first predetermined area, comprising the steps of:

programming at least one first reusable receiver device to receive signals representative of a respective first unique address code, the first receiver device being associated with at least one first particular item whose location within the first predetermined area is to be identified, the first receiver device being programmed by a shipper of the items, wherein the first receiver device provides a signal that can be directly sensed by a human in response to receiving the first address code;

providing one or more unique address codes including the first address code to an intended recipient of the items;

programming a first transmitter device to transmit wireless signals representative of the one or more unique address codes, the first transmitter device being programmed by the intended recipient of the items;

receiving the plurality of items including the first particular item and the first receiver device associated therewith;

interrogating the at least one first receiver device with the coded wireless signals using the first transmitter device; and in response to the human sensible signal provided by the first receiver device receiving the first address code, identifying the location of the first particular item within the first predetermined area, the first particular item being associated with the responsive receiver device, wherein the first receiver device is operative to execute a power management routine, the power management routine including the steps of:

automatically activating the first receiver device for a first predetermined time period, wherein the first predetermined time period is of sufficient duration to allow the first receiver device to receive an amount of bit level data;

in the event the first receiver device receives any bit level data within the first predetermined time period, extending the activation time of the first receiver device beyond the first predetermined time period to a second predetermined time period, wherein the second predetermined time period is of sufficient duration to allow the first receiver device to receive all of the first address code; and in the event the first receiver device fails to receive bit level data within the first predetermined time period, at least partially de-activating the first receiver device.

2. The method of claim 1 wherein the first and second programming steps are substantially performed at a common location.

3. The method of claim 1 wherein the items are selected from the group consisting of packages, cartons, skids, and totes.

4. The method of claim 1 further including the step of re-programming and re-using the at least one first receiver device, wherein the re-programming and re-using step includes re-programming the first receiver device to receive signals representative of a second unique address code, wherein the first receiver device provides a signal that can be directly sensed by a human in response to receiving the second address code, the first receiver device being associated with at least one second particular item whose location is to be identified within the first predetermined area, the at least one first receiver device being re-programmed by the shipper of the items.

5. The method of claim 1 wherein the first programming step is performed by the shipper at a shipper location and the second programming step is performed by the intended recipient at a recipient location, the shipper location being different from the recipient location.

6. The method of claim 5 wherein the providing step includes providing the unique address codes to the intended recipient over a data link disposed between the shipper location and the recipient location.

7. The method of claim 1 wherein the second programming step includes programming an encoder included in the first transmitter device with a series of unique address codes.

8. The method of claim 7 wherein the interrogating step includes sequentially transmitting the series of address codes with the wireless signals.

9. The method of claim 1 wherein the at least one first receiver device comprises at least one tag affixable to the at least one first particular item.

10. The method of claim 1 wherein the human sensible signal provided by the first receiver device comprises an audible indication.

11. The method of claim 1 wherein the human sensible signal provided by the first receiver device comprises a visual indication.

12. The method of claim 1 wherein the human sensible signal provided by the first receiver device comprises an audible indication and a visual indication.

13. The method of claim 1 wherein the first programming step is performed at a shipper location, and wherein the providing step includes providing the unique address codes over a data link between the shipper location and a recipient location.

14. The method of claim 1 wherein the first receiver device includes a memory for storing representations of the first address code, shipper identification data, and recipient identification data.

15. The method of claim 1 further including the step of removably attaching the first receiver device to the item associated therewith.

16. The method of claim 1 further including the step of removably disposing the first receiver device within the item associated therewith.

17. The method of claim 1 further including the step of radiating a signal to a remote annunciator by the first receiver device receiving the first address code.

18. The method of claim 1 further including the step of disassociating the first receiver device from the at least one first particular item associated therewith, and sending the first receiver device back to the shipper for re-use.

19. The method of claim 1 further including the step of disassociating the first receiver device from the at least one first particular item associated therewith, and sending the first receiver device back to an originator of the device.

20. The method of claim 19 wherein the sending step includes sending the first receiver device back to an originator of the device for credit.

21. The method of claim 19 wherein the originator of the receiving device is a manufacturer of the device or a distributor of the device.

22. The method of claim 19 further including the step of re-programming the first receiver device to receive signals representative of a second unique address that is different from the first unique address code to provide a human sensible signal in response to receiving the second unique address code, the first receiver device being associated with at least one second particular item whose location is to be identified within the first predetermined area.

23. The method of claim 22 further including the step of, in response to the human sensible signal provided by the first receiver device receiving the second address code, identifying the location of the second particular item within the first predetermined area, the second particular item being associated with the responsive receiver device.

24. The method of claim 1 wherein the second programming step includes transmitting representations of the one or more unique address codes to the first transmitter device via at least one transmission medium selected from the group consisting of cable, IEEE 802.11b, IEEE 802.11g, and Bluetooth.

25. The method of claim 1 further including the steps of
programming at least one second receiver device to receive signals representative of a respective second unique identifying code,
associating the second receiver device with the first particular item,
wherein the second receiver device provides a signal that can be directly sensed by a human in response to receiving the second identifying code,
programming a second transmitter device to transmit wireless signals representative of one Or more unique identifying codes including the second identifying code, and
interrogating the at least one second receiver device with the coded wireless signals using the second transmitter device,
wherein the second interrogating step is performed by a deliverer of the plurality of items including the first particular item to the intended recipient.

26. The method of claim 25 further including the steps of
in response to the human sensible signal provided by the second receiver device receiving the second address code, identifying a location of the first particular item associated with the responsive receiver device within a second predetermined area by the deliverer of the items, and
delivering at least the first particular item to the intended recipient.

27. The method of claim 25 wherein the second receiver device is reusable.

28. The method of claim 25 wherein the second receiver device is programmed by the deliverer of the items.

29. The method of claim 25 wherein the second transmitter device is programmed by the deliverer of the items.

30. The method of claim 25 wherein the second interrogating step is performed at one or more locations while delivering the first particular item to the intended recipient.

31. The method of claim 25 further including the step of removing the second receiver device from the first particular item before delivering the first particular item to the intended recipient.

32. The method of claim 31 wherein the second receiver device is re-programmable and reusable, and further including the steps of re-programming and re-using the second receiver device.

33. The method of claim 1 wherein the first receiver device is powered by a battery.

34. The method of claim 33 wherein the battery is selected from the group consisting of an alkaline battery, a silver oxide battery, and a lithium battery.

35. The method of claim 1 wherein the amount of bit level data received during the first predetermined time period represents a portion of a respective address code.

36. The method of claim 1 wherein the de-activating step includes de-activating the first receiver device for a third predetermined time period.

37. The method of claim 36 further including the step of, in the event the third predetermined time period expires, automatically re-activating the first receiver device for the first predetermined time period.

38. The method of claim 1 further including the steps of
in the event the first receiver device receives all of the first unique address code within the second predetermined time period, providing the human sensible signal by the first receiver device, and identifying the location of the first particular item within the first predetermined area, the first particular item being associated with the responsive receiver device, and
in the event the first receiver device fails to receive the first unique address code within the second predetermined time period, at least partially de-activating the first receiver device.

39. The method of claim 1 wherein the first reusable receiver device is a semi-passive battery-powered backscatter tag.

40. The method of claim 1 wherein first reusable receiver device is a fully active battery-powered tag.

41. The method of claim 1 wherein the first receiver device is powered by a fuel cell.

42. A system for identifying a location of at least one particular item among a plurality of items disposed within a predetermined area, comprising:
means for programming at least one first reusable receiver device to receive signals representative of a respective first unique address code, the first receiver device being associated with at least one first particular item whose location is to be identified within the predetermined area, the first receiver device being programmed by a shipper of the items,
wherein the first receiver device provides a signal that can be directly sensed by a human in response to receiving the first address code;
means for providing one or more unique address codes including the first address code to an intended recipient of the items;
means for programming a first transmitter device to transmit wireless signals representative of the one or more unique address codes, the first transmitter device being programmed by the intended recipient of the items;
means for receiving the plurality of items including the first particular item and the first receiver device associated therewith;
means for interrogating the at least one first receiver device with the coded wireless signals using the first transmitter device; and
in response to the human sensible signal provided by the first receiver device receiving the first address code, means for identifying the location of the first particular item within the predetermined area, the first particular item being associated with the responsive receiver device,
wherein the first receiver device comprises means for executing a power management routine, including:
means for automatically activating the first receiver device for a first predetermined time period,
wherein the first predetermined time period is of sufficient duration to allow the first receiver device to receive an amount of bit level data;
means for extending the activation time of the first receiver device beyond the first predetermined time period to a second predetermined time period, in the event the first receiver device receives any bit level data within the first predetermined time period,
wherein the second predetermined time period is of sufficient duration to allow the first receiver device to receive all of the first address code; and
means for at least partially de-activating the first receiver device, in the event the first receiver device fails to receive bit level data within the first predetermined time period.

43. The system of claim 42 further including means for re-programming and re-using the at least one first reusable receiver device, wherein the re-programming means includes means for re-programming the first receiver device to receive signals representative of a second unique address code, wherein the first receiver device provides a signal that can be directly sensed by a human in response to receiving the second address code, the first receiver device being associated with at least one second particular item whose location is to be identified within the predetermined area, the at least one first receiver device being re-programmed by the shipper of the items.

44. A method of identifying a location of at least one particular item among a plurality of items disposed within a predetermined area, comprising the steps of:
programming at least one first reusable receiver device to receive signals representative of a respective first unique address code, the first receiver device being associated with at least one first particular item whose location is to be identified within the predetermined area, the first receiver device being programmed by a shipper of the items,
wherein the first receiver device provides a signal that can be directly sensed by a human in response to receiving the first address code;
providing one or more unique address codes including the first address code to an intended recipient of the items;
programming a first transmitter device to transmit wireless signals representative of the one or more unique address codes, the first transmitter device being programmed by the intended recipient of the items;

receiving the plurality of items including the first particular item and the first receiver device associated therewith;

interrogating the at least one first receiver device with the coded wireless signals using the first transmitter device;

in response to the human sensible signal provided by the first receiver device receiving the first address code, identifying the location of the first particular item within the predetermined area, the first particular item being associated with the responsive receiver device;

disassociating the first receiver device from the first particular item associated therewith; and re-programming and re-using the at least one first receiver device, wherein the re-programming and re-using step includes re-programming the first receiver device to receive signals representative of a second unique address code, and wherein the first receiver device provides a signal that can be directly sensed by a human in response to receiving the second address code, the first receiver device being associated with at least one second particular item whose location is to be identified within the predetermined area, the at least one first receiver device being re-programmed by the shipper of the items, wherein the first receiver device is operative to execute a power management routine, the power management routine including the steps of:

automatically activating the first receiver device for a first predetermined time period, wherein the first predetermined time period is of sufficient duration to allow the first receiver device to receive an amount of bit level data;

in the event the first receiver device receives any bit level data within the first predetermined time period, extending the activation time of the first receiver device beyond the first predetermined time period to a second predetermined time period, wherein the second predetermined time period is of sufficient duration to allow the first receiver device to receive all of the first address code; and in the event the first receiver device fails to receive bit level data within the first predetermined time period, at least partially de-activating the first receiver device.

* * * * *